Oct. 31, 1967   E. C. HERBKERSMAN   3,349,416
TOOL CARRIAGE POSITIONER AND COMBINATION THEREOF
WITH THREADING MACHINE
Filed July 23, 1965   7 Sheets-Sheet 6

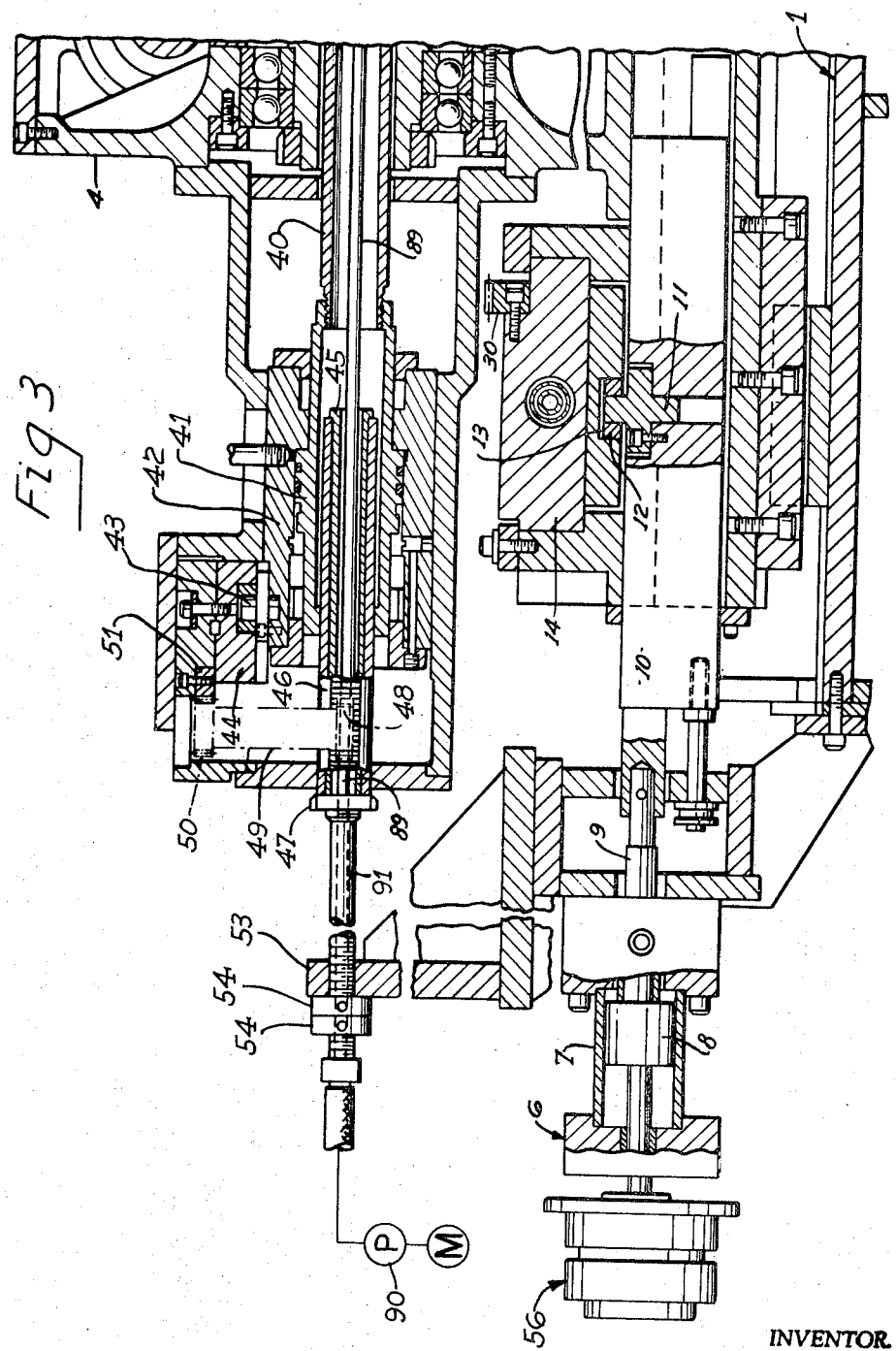

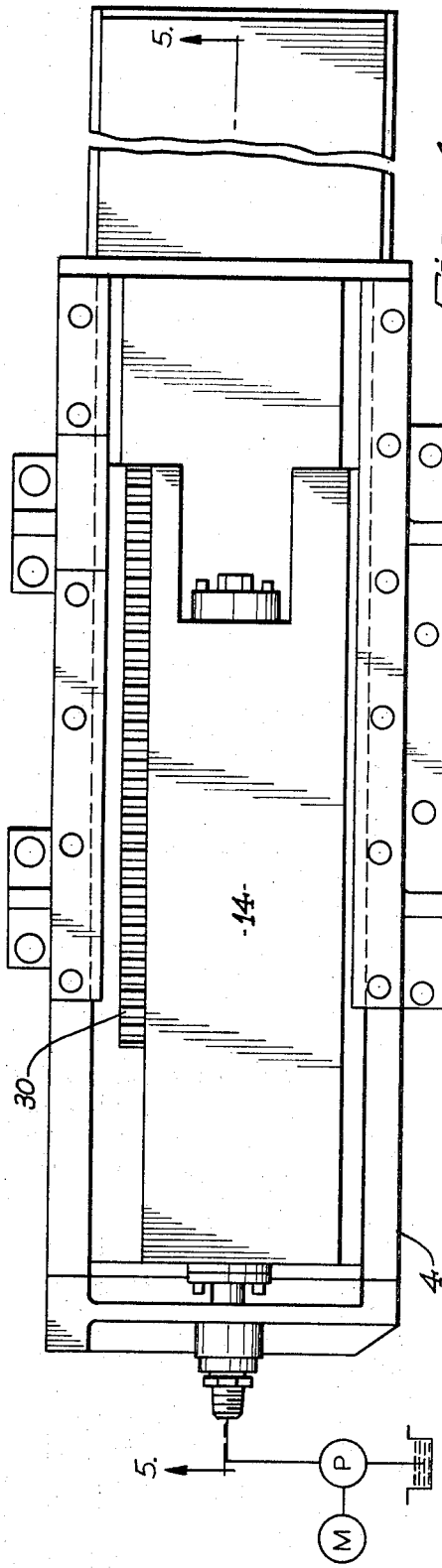
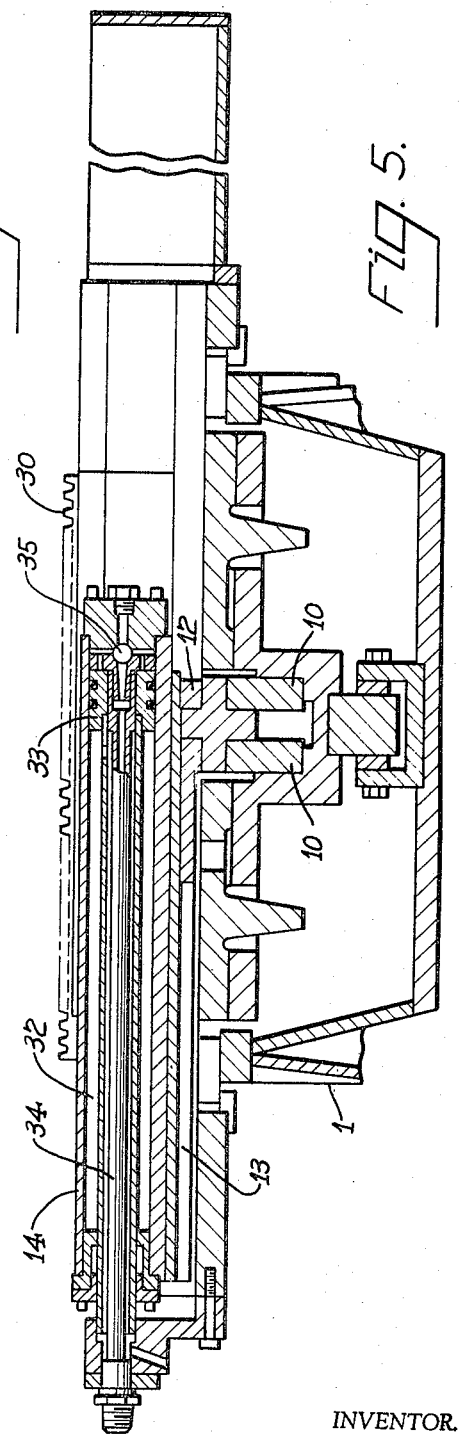

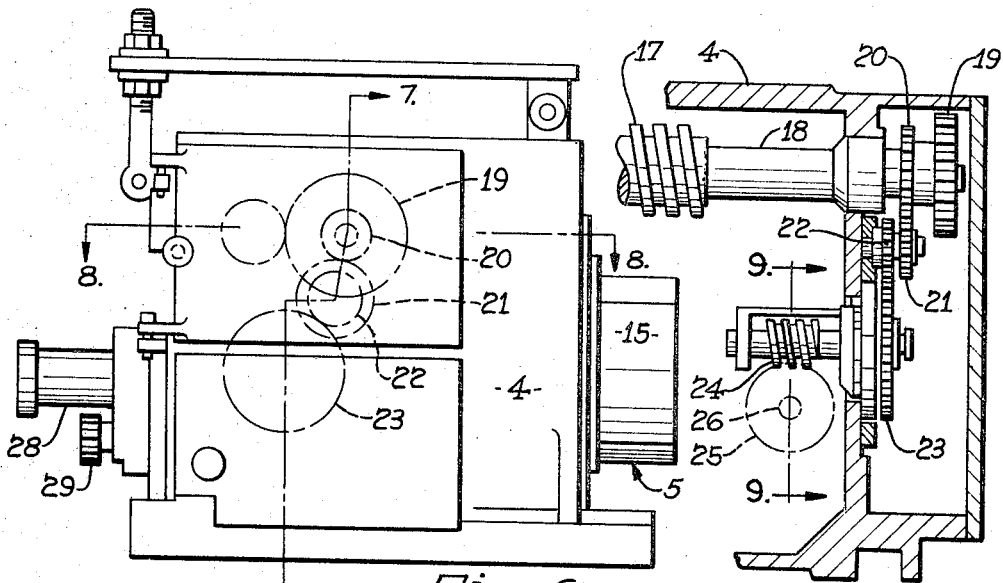
Fig. 6.
Fig. 7.
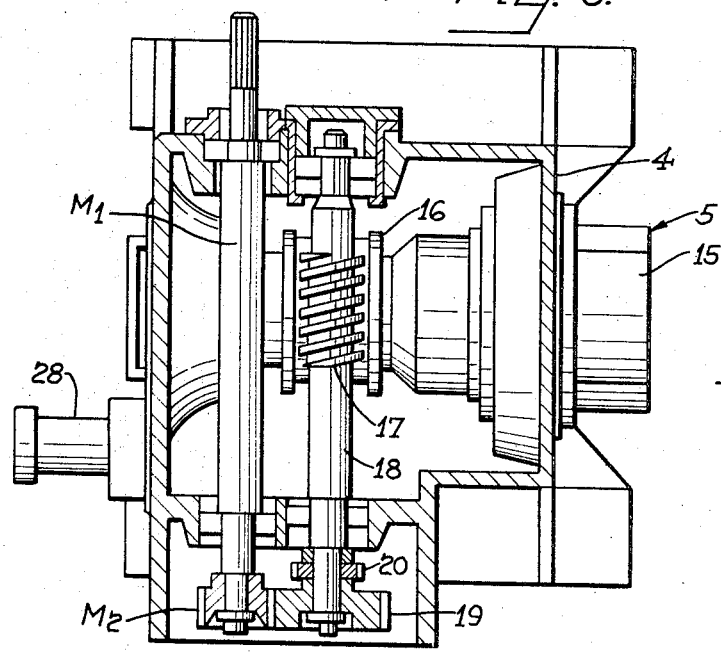
Fig. 8.
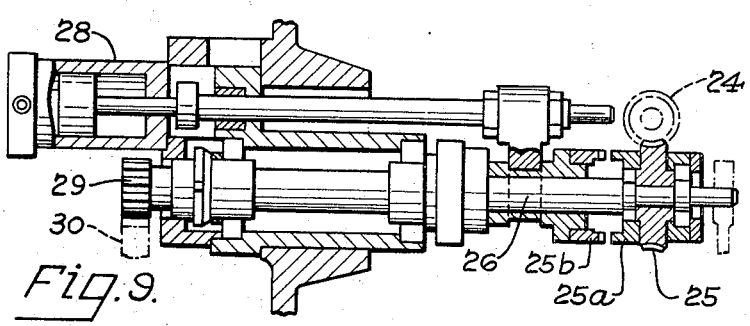
Fig. 9.

INVENTOR.
Earle C. Herbkersman
BY
John H. Leonard,
his ATTORNEY.

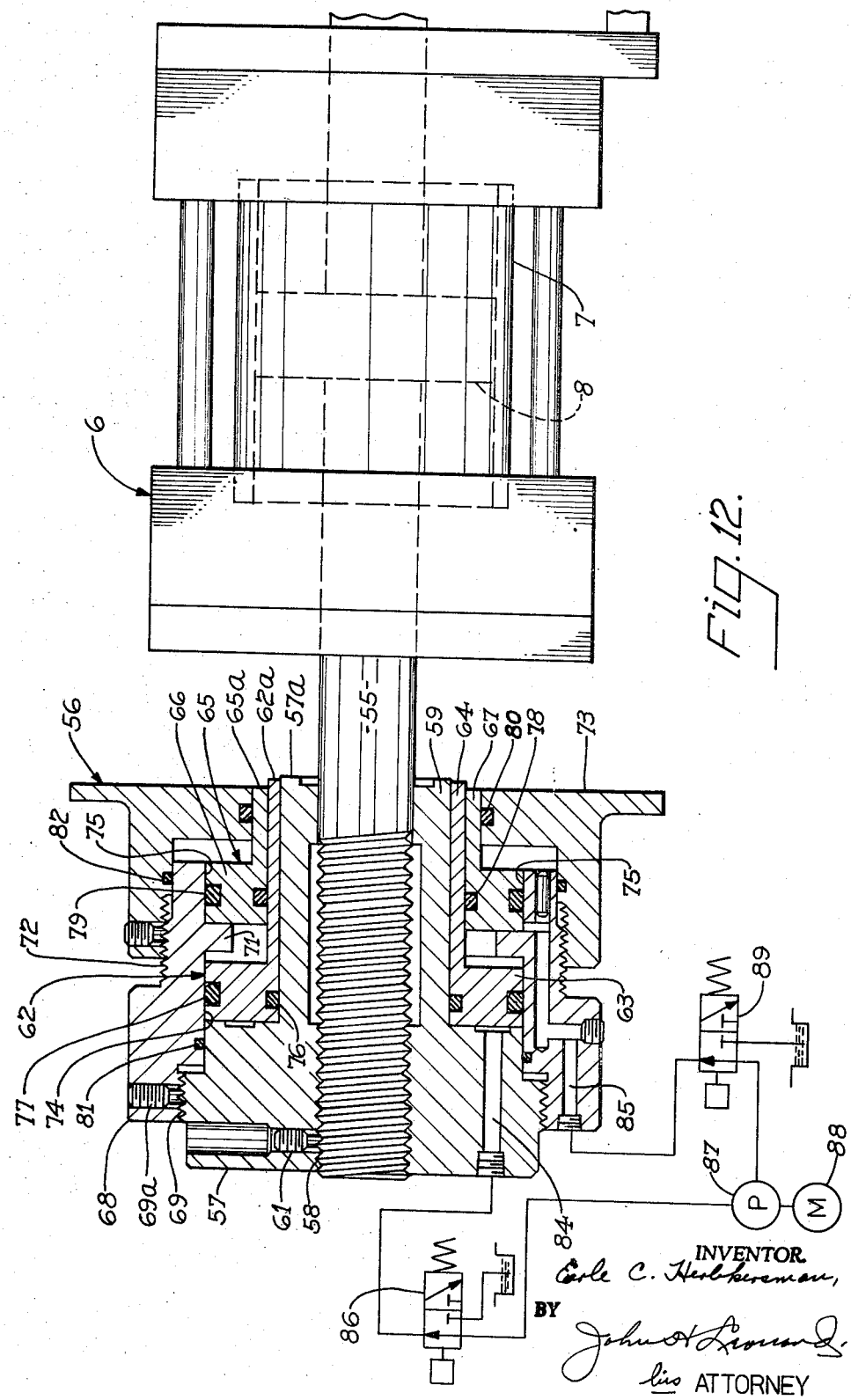

United States Patent Office 3,349,416
Patented Oct. 31, 1967

3,349,416
TOOL CARRIAGE POSITIONER AND COMBINATION THEREOF WITH THREADING MACHINE
Earle C. Herbkersman, Parma, Ohio, assignor to The Pipe Machinery Company, Wickliffe, Ohio, a corporation of Ohio
Filed July 23, 1965, Ser. No. 474,308
13 Claims. (Cl. 10—89)

This invention relates to a selective positioner for arresting the rapid advance traverse of a tool carriage at different preselected feed starting positions.

More specifically the invention relates to the combination of the selective positioner with a pipe threading machine of the type operable for cutting on pipes, and in pipe couplings, tapered and non-tapered threads, wherein a plurality of feed passes by the tool or thread chasers is required for forming the thread.

For the purposes of illustration, the positioner herein is shown in combination with a threading machine of the type disclosed in U.S. Patent No. 2,679,057, of Neil T. Sawdey, issued May 25, 1954, and No. 3,129,445, of Edward E. Jennings, issued Apr. 21, 1964.

In machines of this type, threads are cut by chasers mounted in a rotary tool head which is carried on a spindle mounted on a reciprocable tool carriage. The carriage generally is advanced rapidly on a rapid traverse stroke from a fully retracted starting position to a feed starting position by the slide of rapid traverse mechanism. When the carriage reaches the feed starting position, power driven feed mechanism which drivingly interconnects the carriage and slide of the rapid traverse mechanism drives the carriage relatively to the slide further in the advance direction on a feed pass in timed relation to the rotation of the head for cutting the thread.

The present positioner is particularly desirable when forming tapered threads, such as undercut, or negative angle threads, which require more than one feeding pass, each pass starting on its feed stroke from a different feed starting position. The start of feed from each selected feed starting position must be with the slide of the rapid traverse mechanism in the same starting position relative to the feed mechanism on the carriage and the tool head in the same rotated position as on the preceding pass or passes. Accordingly, a one-position clutch is interposed in the driving train between the spindle and feed mechanism to assure this proper relative rotated starting position of the tool head regardless of the position to which the spindle carriage has been moved by the rapid traverse means. These two relations assure that the chasers start a subsequent pass at the same position circumferentially of the pipe axis as on the preceding pass, but with the chasers offset endwise of the pipe from their original starting feed position. Such a clutch is disclosed in my copending application Ser. No. 163,932, filed Jan. 2, 1962, now Patent No. 3,224,535, and entitled, Pilot Clutch.

Thus two or more feed passes for cutting the thread to final shape by chasers are to be effected, the feed starting positions of the tool head endwise of the pipe for the two passes being different from each other and the rotated position of the head and starting position of the carriage feed mechanism and traverse mechanism being the same relative to their positions on the preceding pass or passes.

Likewise, in the case of tapered threads, the radial starting position of the chasers must always be the same in relation to the start of feed.

As shown in the above patents, the rapid traverse mechanism comprises a slide mounted on the machine bed and connected to the tool carriage and driven on the rapid traverse advance and return strokes by a reversible piston and cylinder assemblage. The assemblage always advances the slide, and hence the carriage, to the same feed starting position of the carriage, and retracts the carriage to the same fully retracted position.

The present selective positioner is settable selectively to stop the slide in preselected advance or feed starting positions which differ from each other, so that the feed of the carriage starts from the selected slide positions on the machine bed, but always with the feed mechanism of the carriage and the slide in the same position relative to each other as on preceding feed passes.

Various specific objects and advantages will become apparent from the following description wherein reference is made to the drawings, in which—

FIG. 3 is a fragmentary vertical longitudinal sectional view through the spindle axis of the machine, and is taken on the line 3—3 of FIG. 2;

FIG. 4 is an enlarged plan view of a portion of the feed mechanism for causing advance of the tool head on its feed stroke or pass;

FIG. 5 is a similarly enlarged fragmentary vertical sectional view taken on the line 5—5 of FIG. 4, and showing the sine bar mechanism and portions of the control therefor;

FIG. 6 is a side elevation of the spindle housing structure, detached from the machine;

FIG. 7 is a fragmentary vertical sectional view taken on the line 7—7 of FIG. 6;

FIG. 8 is an enlarged fragmentary sectional view of the spindle drive mechanism, taken on the line 8—8 of FIG. 6;

FIG. 9 is an enlarged fragmentary sectional view of a one-position clutch mechanism used in the present invention, and is taken on the line 9—9 of FIGS. 2 and 7;

FIG. 12 is a vertical longitudinal sectional view of the positioner, taken on the line 12—12 of FIG. 11, showing it connected to the rapid traverse piston and cylinder assemblage of the present invention.

Figure 1:
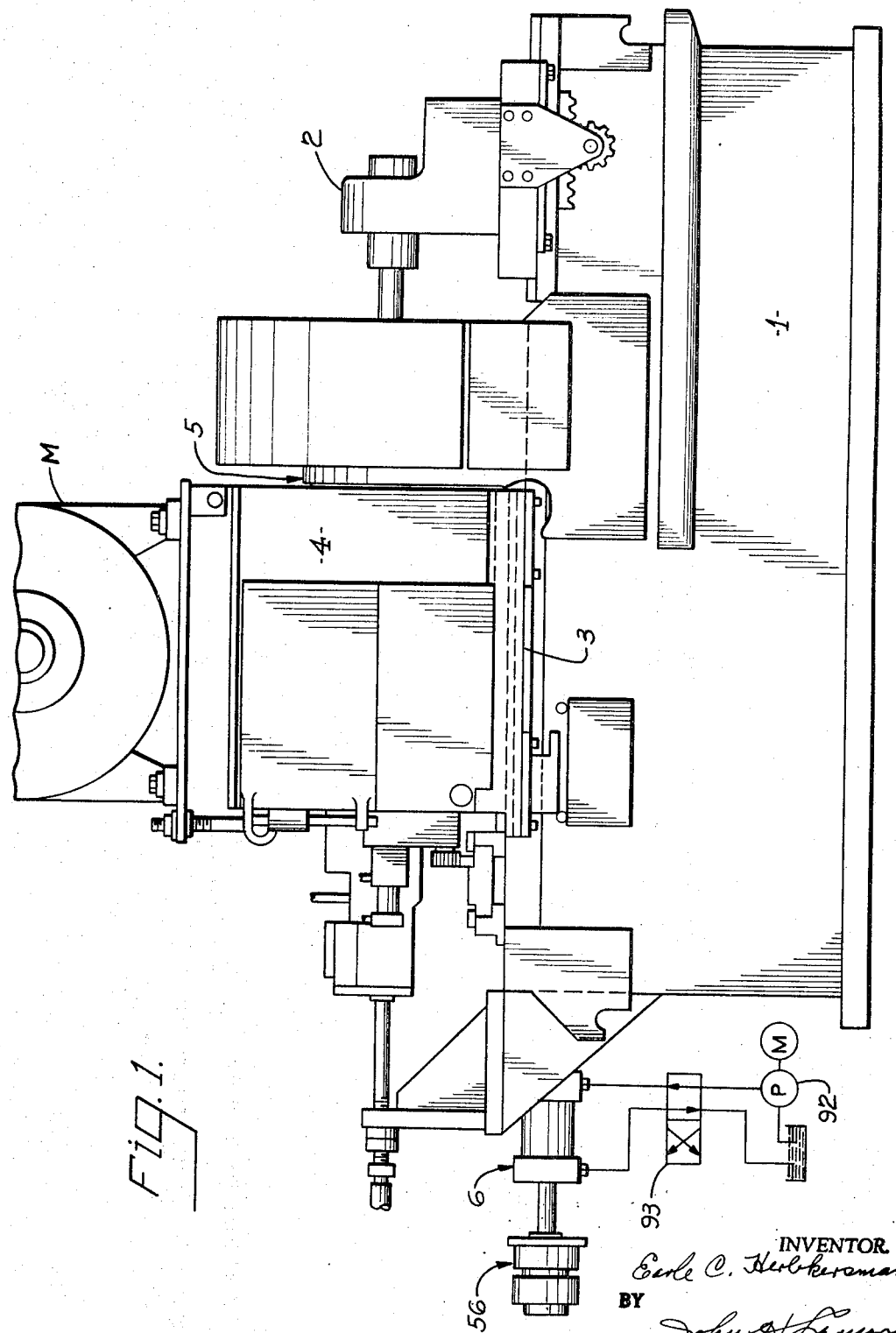
FIG. 1 is a side elevation of a machine embodying the principles of the present invention.
Figure 2:
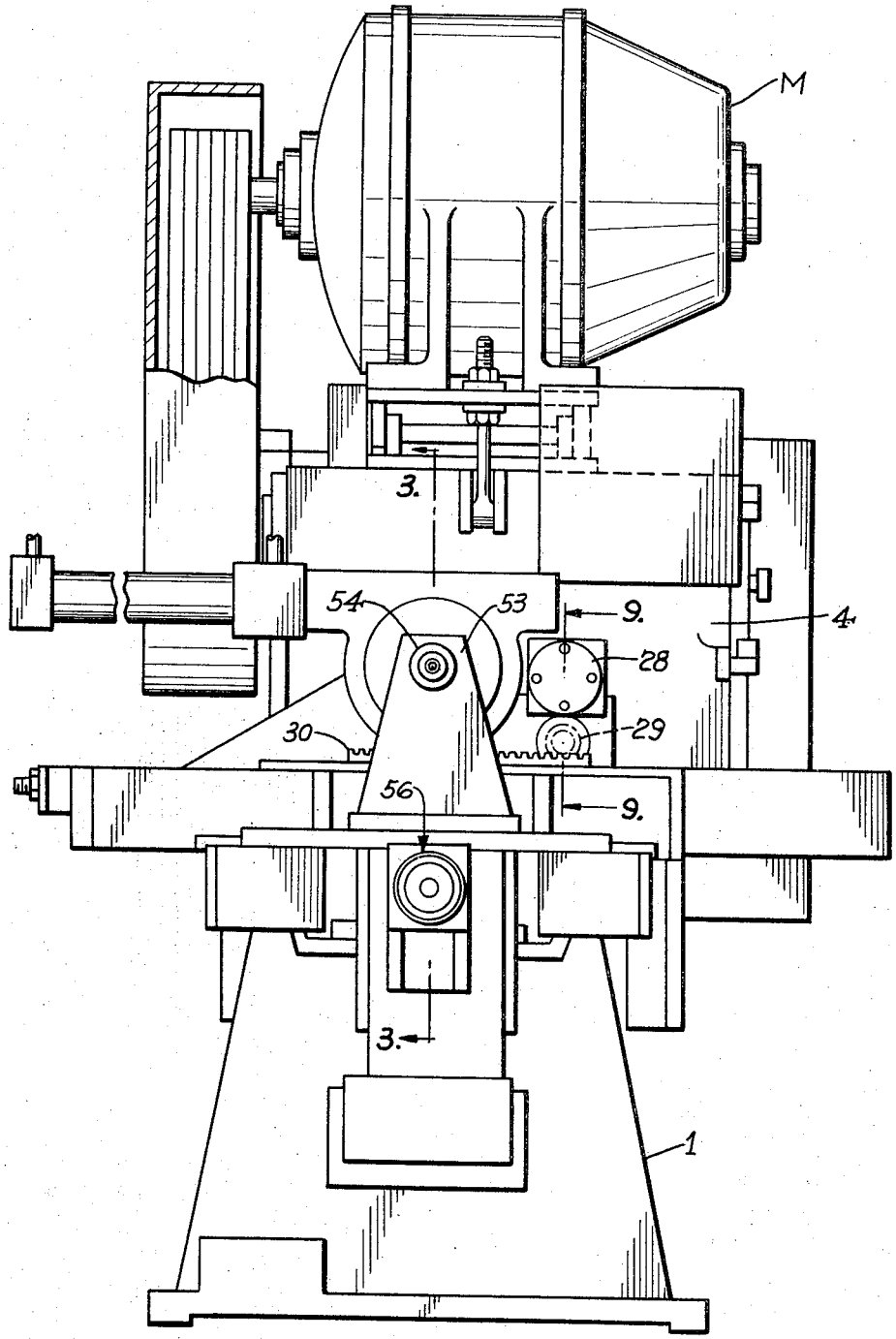
FIG. 2 is a left end elevation of the machine illustrated in FIG. 1.
Figure 10:
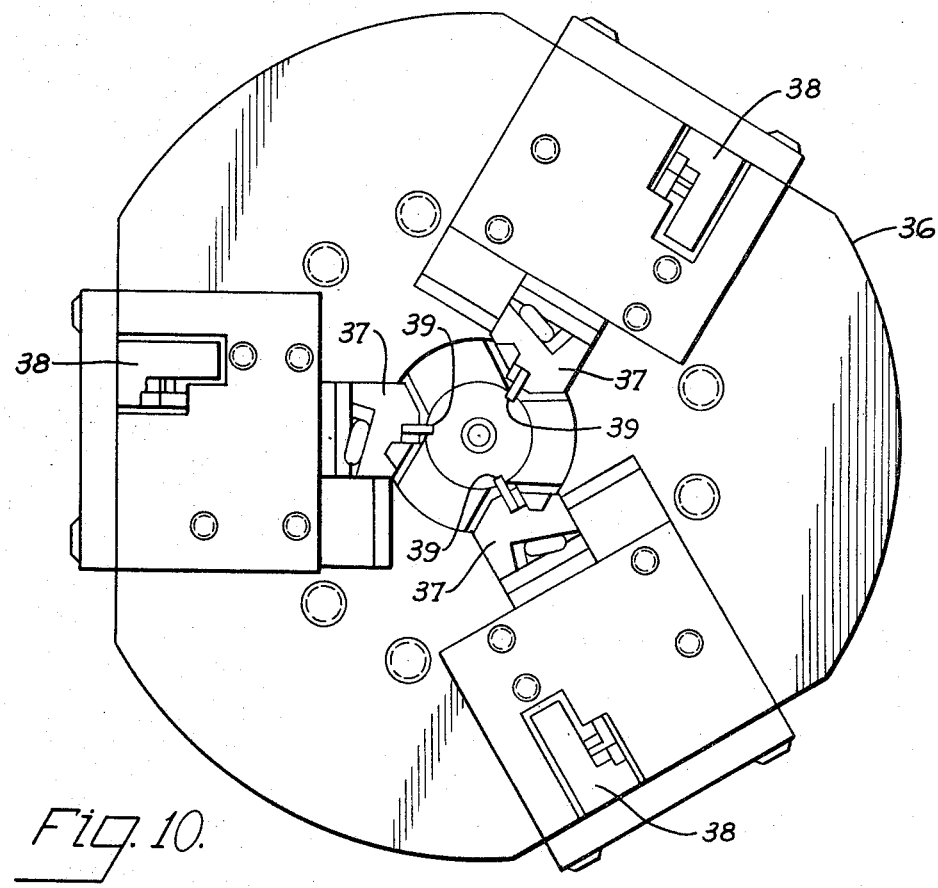
FIG. 10 is an elevation of the rotary tool head as viewed from the right in FIGS. 1 and 8.

Referring to the drawings, the positioner is shown, for purposes of illustration, in combination with a machine for forming external tapered threads on pipe. The machine comprises a frame or bed 1 on which is mounted a work-holding chuck 2 which is adapted to grip a length of pipe and to hold it in fixed axial position relative to the chuck with one end projecting toward the spindle of the machine for purposes of threading.

Mounted on linear slideways 3 on the bed 1 is a spindle carriage 4 in which is rotatably mounted a spindle assembly, indicated generally at 5. The carriage 4, and the operating mechanism carried thereby, are mounted on the slideways 3 so that the carriage 4 can be reciprocated along the frame 1 toward and away from the chuck.

As more fully described in the above patent of Neil T. Sawdey, it is desirable that the spindle carriage be arranged for a rapid traverse axially of the pipe from a fully retracted starting position to a feed starting position in which the threading operation is to be initiated.

For this purpose, a suitable hydraulic piston and cylinder assemblage 6, comprising a cylinder 7 and a piston 8 having a piston rod 9 is secured to the frame 1 of the machine. The rod 9 is connected to a slide 10 which is reciprocable forwardly and rearwardly along suitable guideways on the bed 1. The slide 10 carries a suitable pin 11 with a follower 12 thereon which is slidable in a slideway 13 in a sine bar 14 which is part of the feed means.

Prior to the initiation of the threading operation by the feed means of the spindle carriage 4, the sine bar 14 must be held stationary relative to the slide 10 and spindle carriage. Consequently, upon the introduction of fluid into the head end of the cylinder 7, the slide 10 is moved lineally in the direction in which the spindle carriage 4 is to be advanced. So long as the sine bar 14 is held in this fixed position the connection between the piston rod 9 and the carriage 4 of the spindle through the slide 10 and sine bar 14 is a direct fixed connection and the carriage 4, rod 9 and slide 10 move as a unit endwise of the spindle toward the chuck 2.

The rapid traverse direct drive of the spindle carriage 4 by the assemblage 6 can be, and heretofore normally was, stopped by the piston 8 reaching the rod end of the cylinder 7. When held in this position, the slide 10 is held rigidly and firmly in its forwardmost position and, in this position, the feeding of the spindle for the threading operation is begun.

For feeding on the cutting pass, the slot 13 of the sine bar 14 is on a bias to the direction of sliding of the sine bar and, consequently, as the sine bar 14 is slid transversely of the direction of movement of the slide 10, it advances or retracts the spindle carriage 4 relative to the slide 10, depending upon the direction of movement of the bar 14. This is done in timed relation to the rotation of the spindle, as will now be described.

As illustrated in FIGS. 6 through 9, the spindle, indicated generally at 15, is provided with a main driving gear 16 which is driven by a suitable power driven worm gear 17. The worm gear 17 is mounted on a shaft 18 which is driven by a suitable gear 19 which, in turn, is driven by a motor M on the carriage 4 through a shaft M1 and gear M2, or other suitable means.

Connected to the shaft 18, through suitable speed reduction gears 20, 21, 22, and 23, is a worm gear 24. The worm gear 24 drives a cooperating gear 25 which is rotatable with a clutch element 25a of a one-position clutch, such as disclosed in my above identified copending application. A complementary clutch element 25b is rotatable with, and slidable axially on, the shaft 26 and is arranged to be slid axially thereof by a suitable piston and cylinder assemblage 28 so as to couple the gear 25 drivingly to the shaft 26. The shaft 26, in turn, drives a suitable pinion 29 which engages a rack 30 carried on the sine bar 14.

As best illustrated in FIGS. 4 and 5 the sine bar 14 extends transversely of the machine and the rack 30 extends parallel to the direction of travel of the sine bar. Accordingly, with the spindle operating and the clutch elements 25a and 25b engaged, the shaft 26 is driven in a predetermined timed relation to the rotation of the spindle, and thereby the tool head carried by the spindle. The shaft 26, in turn, drives the sine bar 14 through the pinion 29 and the rack 30 on the sine bar so that the sine bar 14 moves at a predetermined lineal rate of speed relative to the rotary speed of the spindle. This cooperation effects the advance of the spindle carriage by the sine bar 14, and thereby effects the advance of the tool head in fixed relation to the rotation of the spindle, thus determining the pitch of the threads.

As illustrated in FIG. 5, the sine bar 14 is yieldably urged in a direction away from that in which it is driven by the rack and pinion so as to eliminate, as near as may be, any slack in the drive. For this purpose, the sine bar is provided with a cylinder 32 in which is reciprocable a piston head 33 having a rod 34. The cylinder, in the form illustrated, is connected to the sine bar 14 and the rod 34 of the piston is connected to the carriage 4 of the machine. The structure is arranged so that pressure fluid can be admitted to one end of the cylinder to resist yieldably the movement of the sine bar 14 in the direction in which it is driven by the rack 30 and pinion 29 for advancing the spindle carriage 4.

A suitable check valve 35 is provided, this valve being set at a predetermined release pressure so that the maximum pressure resisting movement of the sine bar 14 by its rack 30 and pinion 29 can be predetermined. By admitting pressure fluid to the opposite side of the piston, the sine bar can be retracted at the end of the feed pass of the spindle carriage.

The spindle carries a cutter head, indicated generally at 36, in which are mounted cutting tool carriages 37 which are supported in the head 36 for limited movement in opposite directions transversely or radially of the axis of rotation of the head to extended and retracted positions for cutting engagement and for clearing the pipe when the thread is completed, and for cutting tapered threads, if desired.

For effecting the radial movement of the individual tool carriages 37, blocks 38 are mounted in the head 36 for guided sliding movement parallel to the axis of rotation. The tool carriages 37 and blocks 38 have interengaging wedge means for driving the tool carriages in opposite directions radially upon movement of the blocks 38 axially in opposite directions, all as fully disclosed in the above Patent No. 2,679,057, for example.

The carriages 37 carry thread chasers 39, respectively.

In the form illustrated, the carriages 37 are for cutting external threads and are positioned so that they approach the axis of rotation as the cam blocks 38 are moved rearwardly relative to the head 36.

In order to advance and retract the cam blocks 38, a suitable power transmitting means, not shown in detail, is provided. It includes a tubular sleeve 40 mounted in the spindle and connected to the cam blocks 38 for moving them axially during rotation of the spindle. The sleeve 40 is yieldably urged in a direction rearwardly of the spindle by springs, not shown herein, but fully disclosed in the above Jennings patent.

The sleeve 40, in turn, is fixedly connected to a suitable piston 41 which is reciprocable axially in a cylinder 42. The cylinder 42 is movable axially of the spindle by means of a follower 43 which is movable endwise of the spindle. The follower 43 cooperates with a sine bar 44 which is slidable laterally of the spindle. Fluid pressure can be admitted to either end of the cylinder 42, and the other end vented.

The initiation of the movement of the block 38 toward and away from the axis is controlled in relation to the drive of the carriage 4 by its feed means toward the chuck 2. For controlling the advance and recession of the block 38, a suitable hollow rod 45 is provided and extends into, and is slidable axially of, the piston 41. The rod 45 protrudes rearwardly from the piston and extends beyond the rear of the spindle. At a location beginning a short distance from the rear of the spindle housing, the rod 45 is provided with a detachable sleeve rack 46 which is secured in a fixed relation on the rod 45 by means of a nut 47. The rack 46 is engaged with a suitable pinion 48 which is mounted for rotation on an upright shaft 49 carried by the spindle carriage. The upper end of the shaft 49 carries a pinion 50 which engages a rack 51 on the sine bar 44. Thus, the movement of the sine bar 44 in opposite directions is dependent upon the movement of the rack 46 and, therefore, of the rod 45 forwardly and rearwardly parallel to the axis of the spindle. The sine bar 44 is yieldably urged to its starting position by a piston and cylinder assemblage, not shown herein, but fully disclosed in the above Jennings patent.

A portion of the rod 45 extends to the rear of the spindle and is slidable through a passage in a suitable stop 53 which is mounted in fixed position on the frame 1 of the machine and hence does not move endwise of the frame with the spindle. At the end of the rod, beyond the stop 53 in a direction away from the spindle, the rod is threaded and provided with two adjustable stop nuts 54. These nuts engage the rear face of the stop 53 when the spindle is moved forwardly on the slide 3 a predetermined distance. Upon their engagement with the stop 53, the movement of the rod 45 forwardly with the spindle is arrested and the spindle continues to advance. This causes a relative rearward movement of the rod 45 with respect to the spindle and drives the rack 46 and pinion gears 48 and 50 and hence the sine bar 44 for controlling the rate of retraction of the blocks 38 away from the axis and hence advancement of the tool toward the axis.

Continued movement of the spindle carriage toward the chuck 2 thus drives the rod 45 to the left relative to the spindle carriage, thereby moving the rack to the left and causing it to rotate the pinions 48 and 50 and thereby drive the rack 51 of the sine bar 44, thus urging the sine bar to the left. As the sine bar moves to the left, it imposes a movement, to the left, of the cylinder 42. Since the piston 41 is operable in the cylinder 42 and is urged to the right by the fluid pressure between the left end of the piston and the cylinder, the recession of the cylinder 42 permits the piston to recede to the left, always, however, while yieldably urged and held against the opposite end of the cylinder by fluid pressure. Thus, a yieldable connection is provided. The movement of the piston to the left draws with it the rod 40 which causes the blocks 38 to recede from the axis of the pipe and provide a taper cut.

At the end of the cutting operation, fluid pressure is admitted to the right of the piston 41, the cylinder being vented at its left end. The piston 41 moves to the left relative to the cylinder and further recedes the chasers 39 so that, before return of the head, the tool is clear of the pipe and the pipe can readily be removed axially.

Thus, the piston 41 and cylinder 42 provide an extensible and retractible means drivingly interconnecting the sine bar 44 and rod 40. This extensible and retractible means, when held in extended or retracted position, causes the rod 40 and sine bar 44 to move in predetermined relation to each other, but can be moved from retracted to extended condition, and vice versa, to cause the rod 40 to move independently of the movement of the sine bar 44.

Upon return of the spindle carriage, the effect is a relative motion of the rod 45 in the advance direction of the spindle carriage which, due to the pressure in the cylinder of the sine bar piston and cylinder assemblage, not shown, restores the sine bar 44 to its starting position and returns the rod 45 and rack 46 to their starting position relative to the spindle carriage.

If it is desired to cut only cylindrical bores and constant diameter threads, the stop nuts 54 may be removed, or moved to inoperative positions and the sine bar 44 secured in fixed position. As a result, the sleeve 40 remains in fixed axial position relative to the spindle during rotation and advance of the spindle, and the blocks 38 remain in fixed radial position.

Figure 11:
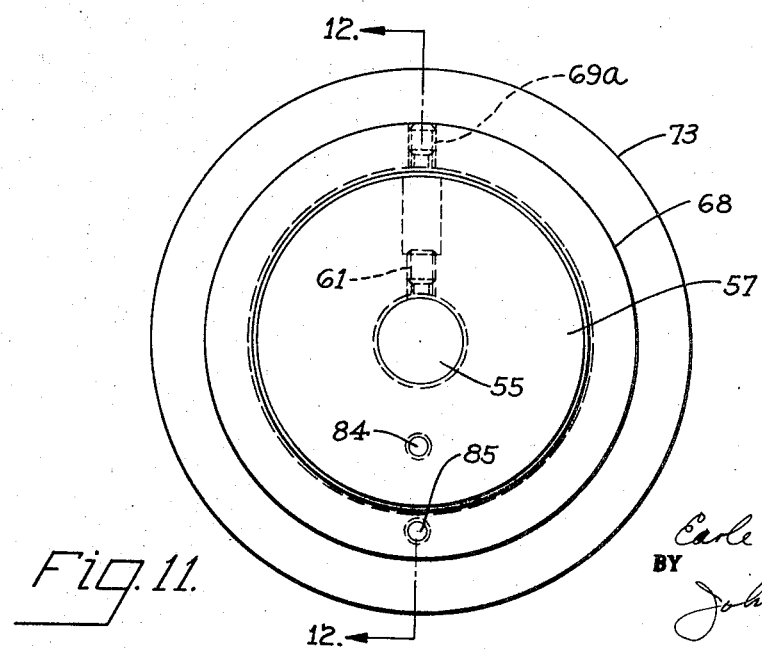
FIG. 11 is a left end elevation of the selective positioner of the present invention.

Referring next to FIGS. 11 and 12, the selective positioner of the present invention is shown in detail as connected to the rapid traverse mechanism.

For this purpose, the piston of the rapid traverse piston and cylinder assemblage 6 is provided with an auxiliary rod 55 and the positioner, indicated generally at 56, is mounted in fixed position on the rod 55 for movement therewith as the piston reciprocates.

The positioner comprises a hollow sleeve 57 which is in threaded engagement with the rod, as indicated 58, so that it can be moved to adjusted position along the rod 55 by relative rotation of the sleeve 57 and rod 55. Sleeve 57 has a reduced diameter cylindrical bearing portion 59 extending from the forward end of the sleeve part way toward the rear end. At the forward end of the bearing portion 59 is a stop shoulder 57a in the form of an annular end surface on the sleeve 57 facing toward, aligned endwise of the rod 55 with abutment surface on the rear end of the cylinder. The sleeve 57 can be locked against rotation in axially adjusted positions of the stop shoulder 57a by means of a lock screw 61. Mounted on the bearing portion 59 for sliding axially thereof is a piston sleeve 62 having as its rear end an enlarged diameter piston 63 and forwardly the piston 63 reduced diameter coaxial bearing portion 64. At the forward end of the portion 64, the piston sleeve 62 has a stop shoulder 62a. The piston sleeve 62 has an axial bore in which the bearing portion 59 is accommodated so as to support the piston sleeve 62 for reciprocation axially of the bearing portion 59.

Mounted on the bearing portion 64 of the piston sleeve 62 is a piston sleeve 65 having at its rear end a piston 66 and forwardly of the piston 66 a reduced diameter coaxial cylindrical bearing portion 67. At its forward end, the piston sleeve 65 has a stop shoulder 65a. The piston sleeve 65 has a central axial bore which receives the bearing portion 64 of the piston sleeve 62 for supporting the piston sleeve 65 for movement axially, relative to the piston sleeve 62.

Mounted on the rear of the sleeve 57 is a sleeve 68. The sleeve 68 is in threaded engagement with the sleeve 57, as indicated at 69, for adjustment of the sleeve 68 axially of the sleeve 57 by rotation of the sleeve 68. The sleeve 68 can be secured and adjusted in a position by means of a lock screw 69a.

The sleeve 68 provided with an annular internal stop shoulder 71 which is disposed in front of the piston 63 of the piston sleeve 62 and limits the forward movement of the piston sleeve 62 axially of the rod 55. The sleeve 68 has a reduced diameter externally threaded portion 72 on which a sleeve 73 is threaded for adjustment axially. The sleeve 73 has an internal cylindrical slide surface which accommodates the bearing portion 67 of the piston sleeve 65. The sleeve 68 has a central bore 74 which, when the sleeve 68 and the sleeve 57 are assembled, provides annular cylinder for the annular piston 63. This cylinder communicates with and is coaxial with the central bore 75 which provides the cylinder for the piston 66 and which is communicated with the space in front of the piston 63.

Suitable gaskets, such as indicated at 76 through 80, are provided, respectively, between 63 and a surface 59, between the outer periphery of the piston 63 and the surface 74, between the outer periphery of the piston 66 and the surface 64, between the outer surface of the piston 66 and the surface 75, and between the outer surface of the piston sleeve 65 and the guide surface 67 of the sleeve 73.

Suitable stationary seals, such as indicated at 81 and 82, respectively, are disposed between sleeve 57 and sleeve 68 and between sleeve 68 and the sleeve 73. The sleeve 57 is provided with a duct 84 which leads into the bore 74 of the sleeve 68 at the rear of the piston 63.

The sleeve 68 is provided with a bore providing a passage 85 which leads into the cavity of the cylinder defined by the wall 75 of the sleeve 68, at the rear of the piston 66. The bore 84 is connected by a suitable reversing valve 86 to a source of pressure fluid, such as a pump 87 driven by a motor 88. The passage 85 also is connected through a reversing valve 89 to the pump 87.

The valves 86 and 89 may be operated by remote control, such as solenoids, as desired, so as to provide desired timing relation. On the other hand, they may be operated manually.

A suitable motor driven pump 90 supplies pressure fluid through the line 91 for effecting the proper operation of the rapid traverse advancing and retracting means. Further, a suitable motor driven pump 92 is connected through the stop and reversing valve 93 to opposite ends of the cylinder 7 for advancing and retracting the carriage 4 rapidly.

In operation, therefore, assuming that the carriage 4 is in a fully retracted position and the clutch elements 25a and 25b are disengaged, in such a case there is no drive through the gear 39 and the rack 30 for the sine bar 14. The bar, therefore, is held stationary by its piston 33 operating in the cylinder 32. In this condition, rapid traverse is effected by admitting pressure fluid at the left end of the cylinder 7. The sine bar 14 being immobilized, the advance of the piston drives the slide 10 and thereby the entire carriage 4 to the right, until the stop shoulder 57a engages the head end plate of the cylinder 7 and stops further advance. This determines the feed starting position for the first pass. When the carriage has reached this feed starting position, as thus selected by the positioner 56, the clutch members 25a and 25b are engaged. Since the clutch is a one-position clutch, they pick up and start the rotation of driving of the gear 29 in exactly the right position relative to the rotated position of the head. While the slide 10 is held in fixed position by cooperation of the positioner 56 and the rapid traverse assembly 6, the movement of the sine bar 14 by the gear 29, initiates and continues the feed stroke of the head. During advance on the feed stroke, suitable recede mechanism causes the chasers to recede from the axis for cutting a tapered thread. At the end of this feed pass, the clutch elements 25a and 25b are disengaged, pressure is admitted to the recede mechanism to retract the chasers from the work so that the head can be withdrawn to starting position. As soon as the chasers are retracted sufficiently, the sine bar 14 is returned to its starting position, thus restoring the sine bar 14 and carriage 4 to their original feed starting relation to each other. At the same time, the rapid traverse mechanism is reversed by admitting pressure fluid to the rod end of the cylinder 7, where upon the slide 10 with the pin 11 retract the carriage to the left. The sine bar has by this time reached its starting position for initiating feed of the carriage. Thus feed pass and return are completed. If another pass is required for forming the thread, the piston sleeve 62 is advanced while the carriage 4 is fully retracted, thus moving its stop shoulder 62a in the advance direction beyond the shoulder 57a of the piston sleeve 57. The piston sleeve 62 is held firmly against the stop 71 by the pressure fluid admitted through the duct 84. Thus as the rapid traverse in the advance direction proceeds on the second pass, the carriage is stopped in a new feed starting position by engagement of the stop shoulder 62a with the cylinder 7, the new position being slightly to the rear of its first starting position. Consequently, the second feed pass starts cutting the pipe slightly in advance of the previous cut.

Again if a third feed pass is desired, pressure fluid is admitted through the duct 85 to the rear of the piston sleeve 65 and advances it so that the stop shoulder 65a is disposed forwardly from the shoulder 62a, and thus engages the rear end of the cylinder 7 and thereby selects a new feed starting position for the carriage, the new position being to the left of the immediately preceding feed starting position. As many such pistons, with their stop shoulders, as desired may be provided, depending upon the number of passes that may be required.

When the passes have been completed and it is desired to start with an initial feed pass wherein the shoulder 57a selects the starting position of the carriage 4, the valves 86 and 89 are operated to permit escape of the pressure fluid from behind the piston sleeves 63 and 66. Thus even though their shoulders 62a and 65a may be in the advanced direction relative to surface 57a, when they engage the rear end of the cylinder 7, they are pushed back to a retracted position. However, the cylinders of the piston sleeves 62 and 65 may be connected through reversing valves which reverse their connections to the pump so that for advancing the pistons, pressure fluid is admitted to the line 84 and for retracting them the inlet from the pump is connected to the line 84.

Having thus described my invention I claim:
1. In a machine tool,
   a bed,
   a carriage mounted on the bed for movement along a predetermined path to and from a retracted position,
   a tool head on the carriage,
   power driven rapid traverse mechanism on the bed movable from a retracted position to advance positions relative to the bed and connected to the carriage for driving the carriage rapidly from a retracted position to advance feed starting positions of the carriage along its path,
   power driven feed means drivingly interconnecting the carriage and rapid traverse mechanism for driving the carriage relative to the rapid traverse mechanism along said carriage path on the carriage feed stroke,
   selective positioning means for stopping, and holding, the rapid traverse mechanism at selected advanced positions of the rapid traverse mechanism,
   and means to render the feed means active and inactive, selectively, while the rapid traverse mechanism is held in its selected advanced positions.

2. The structure according to claim 1 wherein of the rapid traverse mechanism and the bed, one has abutment means in fixed relation to it, and the other has a plurality of movable abutments individually settable to different distances from the abutment means and engageable therewith, upon movement of the rapid traverse mechanism in the advance direction, to stop the rapid traverse mechanism at different advanced positions, at least one of the abutments being movable to an extended position.

3. The structure according to claim 2 wherein the abutment means are on the bed and the abutments are on the rapid traverse means.

4. The structure according to claim 2 wherein one of the abutments is movable to and from a position in advance of another of the abutments, and rapid acting power means are provided and connected to said one abutment and are operable for moving said one abutment to said position between feed strokes of the carriage.

5. The structure according to claim 4 wherein the rapid traverse means comprises a slide mounted on the bed for movement to and from a retracted position, a cylinder mounted on the bed, a piston mounted in the cylinder and bearing oppositely extending rods, one of said rods being connected to the slide and the other of said rods being connected to, and supporting, the positioning means and being operative to move the positioning means toward and away from the abutment means upon operation of the piston.

6. A settable positioning means, a support, a first abutment carried by the support and being a stop shoulder exposed at one end of the support in a predetermined position endwise of the support, a second abutment mounted on the support for movement to advanced and retracted positions endwise of the support, and having a stop shoulder which, in one of said positions is exposed at the end of the support in a location endwise of the support different from said predetermined position, rapid acting driver means for moving said second abutment to one of its positions and for releasing it for return to the other of its positions, and means for rendering the rapid acting drive means active and inactive, selectively.

7. A repositioner comprising a hollow body having a front end, a plurality of a cylinder in the body extending endwise thereof, pistons in the cylinders, respectively, each piston having a rod extending out of the front end of the body, each rod having a stop shoulder on its forward end, stop means in the body for the pistons, respectively, each stop being operable to stop its associated piston, when the piston has moved a predetermined distance forwardly, in positions wherein the stop shoulders are different distances from the front end of the body, and means for the cylinders, respectively, to admit fluid pressure to the head ends of the cylinders, selectively, and to release said fluid pressure.

8. A repositioner wherein said body has a rear portion and a cylindrical bearing portion extending forwardly therefrom, one piston and its rod have a common axial bore in which said bearing portion is accommodated for supporting the piston and its rod thereon for sliding endwise of the body in coaxial relation to said bearing portion, the rod has an external coaxial bearing surface, a second piston and its rod have a common bore in which the first piston rod is accommodated for supporting the second piston and its rod on the bearing surface of the first rod in coaxial relation, and said body has annular cylinder cavities with internal peripheral walls in sealed sliding contact with, and coaxial with, the peripheral walls of the pistons, respectively.

9. A positioner wherein the first piston is disposed between the second piston and the rear end of the body, and the second piston is disposed in alignment axially with the first piston and between the first piston and front end of the body.

10. A positioner wherein stops are carried by the body for independent adjustment endwise thereof and have stop surfaces positioned to engage the pistons, respectively, for limiting the advanced positions of the pistons.

11. A selective positioning stop comprising a body having bearing portion extending forwardly therefrom and having an external cylinder slide bearing surface, a first piston and rod having a common axial bore slidably accommodating said bearing portion for slidably supporting the piston and rod thereon, said rod having a coaxial cylindrical external slide bearing surface, a second piston and rod having a common axial bore for slidably supporting the second piston and rod on the first rod, a first sleeve mounted on the exterior of the body for adjustment forwardly and rearwardly thereof, selectively, said sleeve having an internal bore forming with the body and annular cylinder coaxial with and accommodating the first piston and second piston, said sleeve having an internal stop disposed in front of the first piston and rearwardly from the second piston to limit the movement of the first piston forwardly, a second sleeve mounted on the exterior of the body for adjustment forwardly and rearwardly thereof, selectively, said second sleeve having an internal stop disposed forwardly of the second piston to limit the movement of the second piston forwardly, and said bearing portion and piston rods having shoulders on their forward ends, respectively, which are disposable at preselected advanced positions by admission of pressure fluid to the cylinders, respectively.

12. In a thread cutting machine,
a bed,
a spindle carriage mounted thereon for reciprocation along a predetermined path,
a power driven rotary spindle on the carriage,
a rotary tool head on the carriage and rotatably driven thereby,
power driven rapid traverse means interconnecting the carriage and bed for retracting the carriage to, and advancing it from, a fully retracted position along said path, selectively,
feed means interconnecting the carriage and rapid traverse means and operative when driven for driving the carriage on its feed stroke relative to the rapid traverse means from carriage feed starting positions to which the carriage has been advanced along said path by the rapid traverse means,
a power transmission for driving interconnecting the spindle and feed means for driving the carriage on its feed stroke by the feed means in timed relation to the rotation of the spindle,
a positioner including a plurality of individually selectively settable stops operatively connected to the rapid traverse means,
said stops being operative, when in their set positions, to arrest advance of the rapid traverse means from fully retracted position in different carriage feed starting positions along said path, respectively, and
means for rendering the transmission active while the carriage is in its preselected advanced starting feed position.

13. A thread cutting machine according to claim 12 wherein the last mentioned means is a one-position clutch operable to engage and initiate the drive of the feed through the transmission in the same starting position of the feed means and rotated position of the head in each selected feed starting position of the carriage along said path.

No references cited.

HARRISON L. HINSON, *Primary Examiner.*

UNITED STATES PATENT OFFICE
CERTIFICATE OF CORRECTION

Patent No. 3,349,416                          October 31, 1967

Earle C. Herbkersman

It is certified that error appears in the above identified patent and that said Letters Patent are hereby corrected as shown below:

Column 8, line 58, "a cylinder" should read -- cylinders --. Column 9, line 19, before "bearing" insert -- a --. Column 10 line 18, "driving" should read -- drivingly --.

Signed and sealed this 16th day of February 1971.

(SEAL)

Attest:

Edward M. Fletcher, Jr.

Attesting Officer

WILLIAM E. SCHUYLER, JR.
                                                       Commissioner of Patents